United States Patent
Large

[11] 3,860,627
[45] Jan. 14, 1975

[54] CYANO SUBSTITUTED MALANILATE BIOCIDES
[75] Inventor: George B. Large, Pinole, Calif.
[73] Assignee: Stauffer Chemical Company, Westport, Conn.
[22] Filed: Mar. 9, 1973
[21] Appl. No.: 339,791

[52] U.S. Cl. ............................. 260/465 D, 424/304
[51] Int. Cl. .......................................... C07c 121/78
[58] Field of Search ................................ 260/465 D

[56] References Cited
UNITED STATES PATENTS
3,116,312  12/1963  Shepherd et al. .................... 260/465
3,254,108  5/1966  Maggiulli et al. .................... 260/465

Primary Examiner—Lewis Gotts
Assistant Examiner—Dolph H. Torrence
Attorney, Agent, or Firm—Daniel C. Block

[57] ABSTRACT

This application relates to a biocide active compound having the following formula

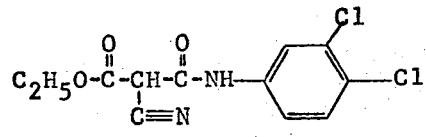

1 Claim, No Drawings

CYANO SUBSTITUTED MALANILATE BIOCIDES

DESCRIPTION OF THE INVENTION

This invention is directed to a compound which may be generally described as a cyano substituted malanilate compound that is active as a biocide. The compound of the present invention has the following formula

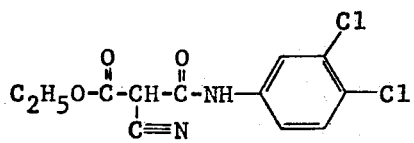

The above compound can be prepared by combining 11.3 g. (0.10M) ethyl cyano acetate and 18.8 g. (0.10M) of 3,4-dichlorophenyl isocyanate in a reaction vessel. While these components were stirred, small portions of triethylamine was added slowly. An exothermic reaction took place which required maintaining the temperature at a range of 30°-40°C. during addition. After the addition of 10.1 g. (0.10M) of triethylamine, the mixture was heated to 80°C. with stirring for 30 minutes. Thereafter, the mixture was cooled and dissolved in acetone. The resulting solution was mixed into a rapidly stirred dilute hydrochloric acid solution. The precipitate is filtered and washed with water, dried in an oven overnight to yield 26.0 g. of a white solid.

BIOCIDE TESTING PROCEDURES

Tubes of sterilized nutrient and malt extract broth are prepared. Aliquots of the toxicant, dissolved in an appropriate solvent, are injected through the stopper, into the broth, to provide concentrations ranging from 50 ppm downward. The test organisms consist of two fungi, *Aspergillus niger* (A.n.) van Tieghem and *Penicillium italicum* (P.i.) Wehmer, and two bacteria, *Escherichia coli* (E.c.) Migula and *Staphylococcus aureus* (S.a.) Rosenbach. Three drops of a spore suspension of each of the fungi are injected into the tubes of malt broth and three drops of the bacteria are injected into the nutrient broth. One week later, the growth of each organism is observed and effectiveness of the chemical is recorded as the lowest concentration in ppm which provides 50 percent inhibition of growth as compared to untreated inoculated tubes. The results of these tests are tabulated in Table I.

TABLE I

| A.n. | P.i. | E.c. | S.a. |
|---|---|---|---|
| 50 ppm | 50 ppm | 50 ppm | .13 ppm |

IN VITRO AGAR SCREENING TESTS

This test measures the bactericidal, fungicidal and algaecidal properties of a compound when in contact with growing bacteria, fungi or algae in an artificial medium. The test is conducted by adding 20 ml. portions of a suitable warm sterile agar solution into 20 × 100 mm. Petri dishes. Then, the test compound, in 0.5 percent acetone solution, is added to the Petri dishes at levels of 1, 10 and 50 μg/ml. and mixed with the warm mobile agar solution. The treated agar mixture is then allowed to come to room temperature and solidify. Cells of the chosen organism are streaked on the surface of the solidified agar and are then incubated for such lengths of time that untreated samples containing no toxicant show luxurious growth typical of the particular organism. This time varies from 24 hours to one week, depending on the particular organism. The fungi are incubated at 30°C. and the bacteria are incubated at 37°C. The algae are incubated at room temperature under artificial light. Nutrient agar is used as the medium in this test for the bacteria. Potato dextrose agar is used as the medium for the fungi with the exception of *Pullularia pullulans* and *Trichophyton mentagrophytes* for which Emmons agar is used. A modified Jack Meyers agar is used for the growth of the algae.

The extent of growth is noted at the end of the incubation period.

Representative organisms used in this test are as follows:

Bacteria
*Enterobacter aerogenes*
*Bacillus cereus*
*Pseudomonas aeruginosa*
*Brevibacterium ammoniagenes*
*Staphylococcus aureus*
*Escherichia coli*

Fungi
*Asperigillus flavus*
*Aspergillus fumigatus*
*Aspergillus niger*
*Aspergillus oryzae*
*Penicillium italicum*
*Penicillium expansum*
*Penicillium sp.*
*Rhizopus stolonifer*
*Trichophyton mentagrophytes*
*Pullularia pullulans*

Algae
*Scenedesmus obliquus*
*Chlorella pyrenoidosa*

TABLE II

In Vitro Agar Screening Tests

| | Minimum Inhibitory Concentration, ug/ml. COMPOUND |
|---|---|
| Bacteria | |
| Enterobacter aerogenes | >50 |
| Bacillus cereus | 1 |
| Pseudomonas aeruginosa | >50 |
| Brevibacterium ammoniagenes | (10) |
| Staphylococcus aureus | 5 |
| Escherichia coli | >50 |
| Fungi | |
| Asperigillus flavus | >50 |
| Aspergillus fumigatus | >50 |
| Aspergillus niger | >50 |
| Aspergillus oryzae | >50 |
| Penicillium italicum | (10) |
| Penicillium expensum | >50 |
| Penicillium sp. | — |
| Rhizopus Stolonifer | >50 |
| Trichophyton mentagrophytes | 50 |
| Pullularia pullulans | >50 |
| Penicillium ochra-chloron | >50 |
| Penicillium vermiculatom | >50 |
| Phoma herbarum | >50 |
| Algae | |
| Scenedesmus obliquus | (10) |
| Chlorella pyrenoidosa | 50 |

( ) indicates partial control at this concentration
— not tested
> greater than

SULFATE REDUCING BACTERIA IN VITRO TEST

This test measures the bactericidal properties of a compound when in contact with a sulfate reducing bacteria, specifically *Desulfovibrio desulfuricans*. The test is conducted by dissolving the test compound in acetone to give an 0.5 percent solution. This toxicant is added to vials containing sterile Sulfate API broth with tryptone under anaerobic conditions at such levels to give final toxicant concentrations of 1, 5, 10 and 50 μg/ml. of solution. An inoculant solution of 0.5 ml. of the growing organism, *Desulfovibrio desulfuricans*, is added to the vials followed by sufficient sterile distilled water to give a total of 10 ml. solution in the vials. The vials are incubated at room temperature for 3 to 5 days until untreated controls show growth of the organism as indicated by the black color development in the vials.

The following is a summary of the minimum inhibitory concentration necessary to control the organism.

TABLE III

|  | Compound |
|---|---|
| Desulfovibrio desulfuricans | 5 |

The compound of this invention is generally embodied into a form suitable for convenient application. For example, the compound can be embodied into pesticidal compositions which are provided in the form of emulsions, suspensions, solutions, dusts and aerosol sprays. In general, such compositions will contain, in addition to the active compound, the adjuvants which are found normally in pesticide preparations. In these compositions, the active compound of this invention can be employed as the sole pesticide component or it can be used in admixture with other compounds having similar utility. The pesticide compositions of this invention can contain, as adjuvants, organic solvents, such as sesame oil, xylene range solvents, heavy petroleum, etc.; water; emulsifying agents; surface active agents; talc; pyrophyllite; diatomite; gypsum; clays; propellants, such as dichlorodifluoromethane, etc. If desired, however, the active compound can be applied directly to feedstuffs, seeds, etc. upon which the pests feed. When applied in such a manner, it will be advantageous to use a compound which is not volatile. In connection with the activity of the presently disclosed pesticidal compounds, it should be fully understood that it is not necessary that they be active as such. The purposes of this invention will be fully served if the compound is rendered active by external influences, such as light or by some physiological action which occurs when the compound is ingested into the body of the pest.

The precise manner in which the pesticidal compositions of this invention are used in any particular instance will be readily apparent to a person skilled in the art. Generally, the active pesticide compound will be embodied in the form of a liquid composition; for example, an emulsion, suspension, or aerosol spray. While the concentration of the active pesticide in the present compositions can vary within rather wide limits, ordinarily the pesticide compound will comprise not more than about 15.0 percent by weight of the composition. Preferably, however, the pesticide compositions of this invention will be in the form of solutions or suspensions containing about 0.1 to 1.0 percent by weight of the active pesticide compound.

What is claimed:

1. A compound having the following formula:

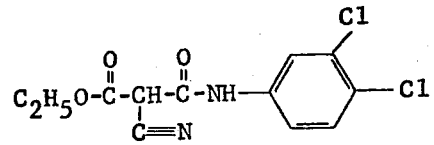

* * * * *